United States Patent
Elrod

(10) Patent No.: US 7,495,721 B2
(45) Date of Patent: Feb. 24, 2009

(54) METHODS OF PRINTING FILTER MATERIAL TO FABRICATE COLOR FILTER

(75) Inventor: Scott A. Elrod, LaHonda, CA (US)

(73) Assignee: Xerox Corporation, Norwalk, CT (US)

( * ) Notice: Subject to any disclaimer, the term of this patent is extended or adjusted under 35 U.S.C. 154(b) by 878 days.

(21) Appl. No.: 11/016,975

(22) Filed: Dec. 20, 2004

(65) Prior Publication Data

US 2006/0134315 A1 Jun. 22, 2006

(51) Int. Cl.
  *G02F 1/1335* (2006.01)
(52) U.S. Cl. ...................................... 349/106
(58) Field of Classification Search ........................ None
  See application file for complete search history.

(56) References Cited

U.S. PATENT DOCUMENTS

| | | | |
|---|---|---|---|
| 4,786,148 A | 11/1988 | Sekimura et al. |
| 4,812,387 A | 3/1989 | Suzuki et al. |
| 4,820,619 A | 4/1989 | Sanada et al. |
| 4,837,098 A | 6/1989 | Shimamura et al. |
| 5,085,973 A | 2/1992 | Shimizu et al. |
| 5,495,270 A | 2/1996 | Burr et al. |
| 5,624,775 A | 4/1997 | Carre et al. |
| 5,641,595 A | 6/1997 | Hsieh et al. |
| 5,645,963 A | 7/1997 | Chang |
| 5,689,291 A | 11/1997 | Tence et al. |
| 6,001,515 A | 12/1999 | Evans et al. |
| 6,242,139 B1 | 6/2001 | Hedrick et al. |
| 6,305,773 B1 | 10/2001 | Burr et al. |
| 6,312,771 B1 | 11/2001 | Kashiwazaki et al. |
| 6,629,739 B2 | 10/2003 | Korol |
| 6,746,102 B2 | 6/2004 | Shinkoda et al. |
| 2003/0176005 A1 | 9/2003 | Takano et al. |
| 2004/0004643 A1 | 1/2004 | Satomura |

(Continued)

FOREIGN PATENT DOCUMENTS

EP  0 895 101 A2  2/1999

(Continued)

OTHER PUBLICATIONS

European Search Report, Application No. EP 05 11 2387, Completion date Feb. 16, 2006.

(Continued)

*Primary Examiner*—Sung H Pak
(74) *Attorney, Agent, or Firm*—Fay Sharpe LLP

(57) ABSTRACT

Several methods of printing filter material on a substrate to fabricate a color filter are provided. In one embodiment, the method includes: a) providing a substrate with a framework forming a cell, b) providing a liquid filter material ejection system with an inkjet print head, a liquid filter material, and a table supporting the substrate, and c) ejecting liquid filter material drops in the cell from the inkjet print head using a drop size printing process. The drops include smaller and larger drops. A color filter for a display device is also provided. In one embodiment, the color filter includes: a substrate, a framework attached to the substrate forming a cell, and a cured filter material fixed to the cell. The cured filter material is formed by ejecting multiple sizes of liquid filter material drops from an inkjet print head using a drop size switching printing process.

25 Claims, 10 Drawing Sheets

U.S. PATENT DOCUMENTS

2004/0119776 A1  6/2004  Nakamura
2004/0207780 A1  10/2004  Matsuoka et al.
2004/0239721 A1  12/2004  Usuda

FOREIGN PATENT DOCUMENTS

EP    1 426 184 A1    6/2004

OTHER PUBLICATIONS

European Office Action, Application No. EP 05 112 387.5-2217, Dated Feb. 15, 2008 (received by Attorney for Applicant Apr. 17, 2008).

EP Application No. EP 05 11 2387, Communication pursuant to Article 94(3) EPC, European Patent Office, Feb. 15, 2008 (4 pages).

METHODS OF PRINTING FILTER MATERIAL TO FABRICATE COLOR FILTER

BACKGROUND

The exemplary embodiments disclosed herein relate to methods of printing filter material to fabricate a color filter. It finds particular application in conjunction with printing the red, green, and blue filter material to fabricate a color filter for a display, such as a liquid crystal display (LCD), and will be described with particular reference thereto. However, it is to be appreciated that the exemplary embodiments are also amenable to fabrication of color filters for other types of displays, display devices, and like applications.

With the rapid growth of the information industry and continuous breakthroughs in the display technologies, a trend is becoming increasingly recognizable in that flat panel displays (FPD), which take up a much smaller space, are gradually taking the place of the traditional cathode ray tubes (CRT). Among the various flat panel displays, liquid crystal displays (LCD) have assumed a leading position, because of their light weight, small thickness, low driving voltage required, and low energy consumption. Another reason for the wide popularity of LCDs can also be attributed, at least in part, to the rapid development of the technologies that LCDs have been associated with. More recently, with the successful development of thin film transistors (TFT), LCDs now have acquired the capability of becoming a full-color display ready for a much broader consumer market. This development further enhances the already immense potential of LCDs.

With both the multi-color and full-color LCDs, chroma control and brightness control are the two most essential elements. These elements are provided by a high-grey-level (black-and-white) LCD, color filter films, and backlight devices.

A color filter commonly comprises three main components: a black-hued (i.e., black-colored) matrix, a color filter layer, and an overcoat. Currently, at least five methods have been disclosed in the prior art for making the color filter layer. These include: 1) dyeing, 2) etching, 3) pigment dispersion, 4) electrodeposition, and 5) printing.

The dyeing method and the etching method primarily utilize an appropriate arrangement of dyes to prepare color filters. A wide variety of dyes have been taught in the prior art references many of which provide homogeneous chroma, high dyeability, and allow a wide selection of compatible resins for which desired color intensity and light transmissibility can be provided. U.S. Pat. No. 4,820,619, the content thereof is incorporated herein by reference, a photosensitive composition is disclosed for use in preparing a color filter which contains a copolymer of glycidyl (meth)acrylate or glycidyl (α-methyl)vinyl ether with a (meth)acrylic amide or ester having a quaternary ammonium salt structure, and an aromatic azide as a photosensitizer. U.S. Pat. No. 4,837,098, the content thereof is incorporated herein by reference, discloses a colored filter layer comprising three groups of filter picture elements having spectral characteristics respectively corresponding to red, green and blue. Each group of filter picture elements (R, G, B) are made of polyimide resin and dye contained therein. Because of the relatively inadequate light and heat resistances of the dyeing materials, the methods of dyeing and etching discussed above have been largely replaced by the pigment dispersion method and/or the electrodeposition method, both of which utilize pigments that exhibit superior light and heat resistances. In these methods, pigment particles are uniformly dispersed in a resin matrix. Typically, the pigment particles are controlled to have a particle size less than 0.2 μm so as to ensure reliable coloring characteristics. U.S. Pat. No. 5,085,973, the content thereof is incorporated herein by reference, discloses a color filter prepared by providing red, green, and blue image elements, each imaging element comprising a photosensitive resin and a pigment, and a black matrix on a transparent glass substrate. The photosensitive resin is formulated such that it comprises a polyfunctional acrylate monomer, an organic polymer binder and a photopolymerization initiator comprising a 2-mercapto-5-substituted thiadiazole compound, a phenyl ketone compound, and 2,4,5-triphenylimidazolyl dimer composed of two lophine residues combined to each other through intermediation of a single covalent bond.

U.S. Pat. No. 4,786,148, the content thereof is incorporated herein by reference, discloses a color filter comprising a substrate and colored resin films, including blue, green and red resin films containing blue, green, red colorant particles, respectively. The average particle volumes of the blue, green and red colorants are set that the blue particles are greater than the green particles, which are further greater than the red particles. The pigment method is also disclosed in, for example, Japan Laid-Open Patent. Publication JP60-129739. With the pigment dispersion method, lithographic techniques can be utilized to improve resolution, increase the flexibility of pattern design, and form color filters that can be used in TFT-LCDs. However, the conventional pigment-related methods typically involve a relatively complex process, and they require at least three photomasks which must be precisely aligned to ensure good quality. Furthermore, because the pigment dispersion method involves a free radical reaction to form a thermoset resin, a protective layer is required so as to avoid contact with oxygen.

U.S. Pat. No. 4,812,387, the content thereof is incorporated herein by reference, described an example of the electrodeposition coating process, by which a coating film is formed for filling the space between the color stripes for a color filter which is used for the colorization of a liquid crystal display. With the electrodeposition coating processes, a transparent electrode is prepared by patterning a transparent electrically conductive film (typically an indium-tin oxide (ITO)) which is deposited on a substrate and serves as an electrode, and an electric voltage is applied only to a portion of the patterned transparent electrode which is to be dyed in the same color. The substrate is then immersed in a coloring electrodeposition bath containing appropriate polymers and pigment dispersed in water, and a colored layer is formed by electrodeposition. Thereafter, electric voltage is applied only to another portion of the substrate which is to be dyed in a different color, and the substrate is then immersed in another colored electrodeposition bath for forming a different color layer via electrodeposition. This procedure is repeated until all the desired colored layers are formed. The disadvantages of the electrodeposition coating process are that it is necessary to perform a high precision patterning of the transparent electrode, and to pay meticulous attention during the subsequent process not to break the fine pattern, because otherwise, the subsequent coloring process will be rendered very difficult. The electrodeposition coating technique is limited in its applications because it requires a substrate with a stripe pattern of conductive (ITO) film (the stripe pattern consists of a plurality of segregated parallel lines) for implementation, and it typically cannot be used without the stripe patterns. Thus, the electrodeposition coating processes are suitable for the preparation of color filters for use in STN-LCDs, and have limited applications.

Nippon Oil Company proposed an electrodeposition lithographic method (ED-litho) for making color filters which combined the electrodeposition (ED) coating method and the lithographic (litho) technique. In U.S. Pat. No. 5,214,542, the content thereof is incorporated herein by reference, Nippon Oil disclosed an electrodeposition lithographic method, which involves the steps of: (a) forming a photosensitive coating film on a transparent electrically conductive layer provided on an outermost surface of a substrate having an alignment film, (b) exposing the photosensitive coating film to light through a mask having patterns of at least three different degrees of light transmittances; (c) developing and removing a photosensitive coating film portion registering with one of the patterns of smallest and largest degrees of light transmittances to expose the transparent electrically conductive layer; (d) electrodepositing a colored coating on the exposed electrically conductive layer to form a colored layer thereon, and (e) repeating the step (d) for the respective patterns of different degrees of light transmittances in sequence of difference in light transmittances to form different colored layers, respectively. U.S. Pat. No. 5,214,541, the content thereof is incorporated herein by reference, discloses the additional step of transcribing the colored layers, the transparent electrically conductive layer, and the alignment film onto another substrate.

The electrodeposition lithographic method requires developer solutions at least three different levels of concentrations so as to selectively remove the exposed photoresist at different stages of the development process, thus it allows only a relatively narrow process window within which tolerance is acceptable, and there exist only very limited options in selecting an appropriate photoresist. Additionally, only a limited number of options of photoresist-developer combinations can be utilized. This is especially true when a positive photoresist is used, in which only cationic electrodeposition resins can be used and anionic cannot be used.

If an anionic electrodeposition resin is used, then the basic developer solution can easily remove those acidic colored resins that have been electrodeposited but have not been hardened. This problem is further complicated by the fact that the colored resin cannot be hardened by light or heat during the electrodeposition lithographic process so as to ameliorate the problem caused by the uncured colored resin. Therefore, when the electrodeposition lithographic method is used, a positive photoresist must be used in conjunction with a cationic electrodeposition resin. Only negative photoresists can be used with an anionic electrodeposition resin; however, it is well known that negative photoresists do not provide the same dimensional precision as positive photoresists, and the trend in the industry is using positive photoresists. It is also well-known to those skilled in the art pertaining to pigment chemistry that cationic colored electrodeposition resins exhibit far superior characteristics, including stability (against decolorization), ease of emulsification, pigment dispersability (especially at high pigment concentrations), as well as lower raw material cost than their anionic counterparts. Thus the electrodeposition lithographic method disclosed in the prior art, which, almost by default, requires the combination of positive photoresist and anionic colored electrodeposition resin, does not represent the best, or the most desired, choice.

Among all the processes for preparing color filters, the printing process is the least expensive process. However, it suffers the problems of poor dimensional precision, uniformity, smoothness, and reliability, and is not well accepted by the industry for making high quality electronic products.

For example, U.S. Pat. No. 6,242,139, the content thereof is incorporated herein by reference, discloses a process to fabricate a color filter for use in a liquid crystal or similar display by providing a means to successfully use an inkjet printing system to deposit colored inks in a predetermined position by using a physical barrier to prevent flow of the ink from the designated cell to which it is delivered. With respect to the ink-jet printing method, the physical barrier is described as a raised black mask placed onto a glass or polymeric sheet using a lithographic step or a high resolution printing step. However, for the ink-jet printing method to work effectively, the thickness of the black mask (i.e., black matrix) must be significantly thicker than is found in current LCDs.

BRIEF DESCRIPTION

In one aspect, a method of printing a filter material on a substrate in conjunction with fabrication of a color filter is provided. In one embodiment, the method includes: a) providing a substrate with a framework attached thereto, the framework forming at least one cell, each cell defined by a perimeter wall associated with the framework and a bottom wall associated with the substrate, b) providing a liquid filter material ejection system with an inkjet print head, a first liquid filter material to be selectively ejected by the inkjet print head, and a table supporting the substrate, and c) selectively ejecting a plurality of drops of the first liquid filter material in one or more of the at least one cells from the inkjet print head using a drop size printing process, wherein the plurality of drops of the first liquid filter material associated with each corresponding cell include at least one smaller drop and at least one larger drop selectively ejected in one or more passes of the inkjet print head across the corresponding cell.

DETAILED DESCRIPTION

Figure 1:
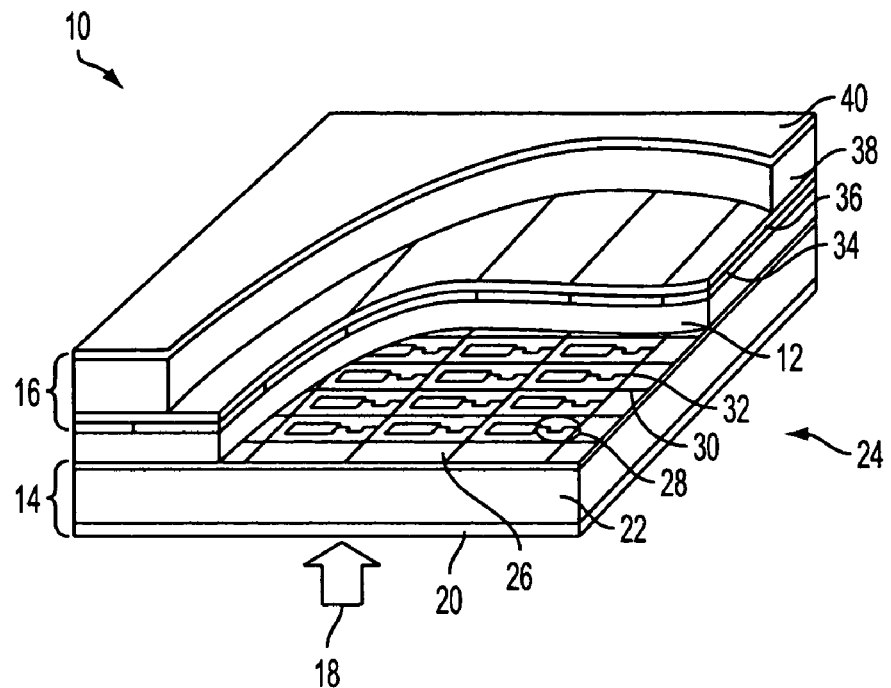
FIG. 1 is a perspective diagram of a cross section of an exemplary embodiment of a thin film transistor (TFT) liquid crystal display (LCD)

In general, drop size switching (DSS) techniques associated with inkjet printing have not been used previously to print filter material (e.g., red, green, and/or blue filter material) on a substrate in fabricating a color filter for a display device. A method for use of inkjet print heads (e.g., piezo, acoustic, thermal, etc.) with a DSS printing process reduces fabrication costs and improves the uniformity characteristics in printing filter material in fabrication of color filters for various types of display devices (e.g., liquid crystal displays (LCDs), light emitting diodes (LEDs), plasma display panel (PDP) devices, etc.). Use of the DSS printing process also reduces the fabrication time for a color filter, particularly where DSS printing replaces lithographic printing or photolithographic processes.

For example, piezo (e.g., piezoelectric, piezoceramic, etc.) print heads can operate in several droplet modes, depending on the character of the voltage waveform applied to the piezo actuator. DSS enables two and sometimes three different drop sizes to be ejected from the same aperture in the print head. There are several different ways to use DSS to enhance the uniformity of filter material that may be associated with, for example, groups of three primary color sub-pixels that form a color pixel in display devices (e.g., LCDs, LEDs, PDP devices, etc.).

In one scenario, the print head is used to put smaller drops in each corner of a recessed cell associated with a geometrically shaped sub-pixel with three or more corners. These drops, if still wet when a larger drop is subsequently deposited in the center of the sub-pixel, can help to insure uniform wetting into the corners of the pixel, without spilling over onto the black matrix. In an alternative approach, the small drops placed in the corners can be partially or fully dried to serve as a barrier to larger drops that are subsequently deposited in the geometrically shaped sub-pixel. The smaller and larger drops may be deposited in one or more passes of the print head. For example, the smaller drops may be deposited in one or more passes and cured or dried to a substantial degree before the larger drops are deposited in one or more subsequent passes. This DSS scenario helps to define a substantially uniform fill for the recessed cell without overlap of the deposited filter material into adjacent sub-pixels (i.e., recessed cells). The smaller drops, for example, may be on the order of 30-50 μm in diameter while the larger drops, for example, may be on the order of 180-360 μm in diameter. Various sizes of drops between, for example, 30 and 360 μm in diameter are envisioned. Similarly, drop diameters less than 30 μm and greater than 360 μm are possible.

An alternative DSS scenario is to print along a perimeter wall of the recessed cell (i.e., sub-pixel) with the smaller drops and fill a central area with larger drops. Again, the smaller drops may be deposited in one or more passes and the larger drops in one or more subsequent passes. The edge droplets can be wet during the subsequent deposition of larger drops in the center of the pixel, in order to insure uniform wetting without spilling over onto the black matrix. Alternatively, the edge droplets can be partially dried to provide a barrier to wetting by subsequent larger droplets.

Another use of the DSS printing process is to meter the amount of color filter material that is put down in color filter pixels. In particular, if there are known non-uniformities across the print head, additional smaller drops can be placed at sub-pixel (i.e., recessed cell) locations that are known to have optical densities that are too low with respect to surrounding filter material or less than a predetermined threshold in one or more additional passes. Another option is to scan the sub-pixels with a sensor (e.g., microdensitometer) after a majority of droplets have been deposited and go back in one or more additional passes with smaller drops to make fine adjustments to sub-pixel locations that are below a predetermined optical density threshold.

With reference to FIG. 1, an exemplary embodiment of a thin film transistor (TFT) LCD 10 depicts a sandwich-like structure with a liquid crystal layer 12 between a TFT glass layer 14 and a color filter glass layer 16. The TFT LCD 10 will be oriented in a display assembly with a light source 18 directing light toward the TFT glass layer 16. With respect to the light path, the TFT glass layer 14 includes a polarizer film 20, a lower glass substrate 22, a TFT layer 24 with transparent electrodes 26, TFTs 28, scanning electrodes 30, and signal electrodes 32. Again, with respect to the light path, the color filter glass layer 16 includes a transparent electrode layer 34, a color filter layer 36, an upper glass substrate 38, and a polarizer film 40.

The TFT layer 24 includes a TFT array with three TFTs for each pixel displayed. Each TFT corresponds to a unit or sub-pixel. The color filter layer 36 includes an array of filter material cells arranged in groups of three primary color filter materials (e.g., red, green, blue). Each filter material group corresponds to a pixel and each filter material cell corresponds to a sub-pixel. The TFT array and filter material array are aligned so that each filter material group is associated with a TFT group and each filter material cell is associated with a TFT. Liquid crystals in the liquid crystal layer 12 move according to the difference in voltage between the color filter glass layer 16 and the TFT glass layer 14. The amount of light supplied by the TFT LCD 10 is determined by the amount of movement of the liquid crystals in such a way as to generate color.

In fabrication, the lower glass substrate 22, and TFT layer 24 are typically assembled with a sealant. Similarly, the transparent electrode layer 34, color filter layer 36, and upper glass substrate 38 are typically assembled with a sealant. A gap is typically maintained between these assembled layers by spacers and liquid crystal material is typically injected into the gap to form the liquid crystal layer 12. Two sheets of polarizer film 20, 40 are attached to the outer faces of the sandwich formed by the upper and lower glass substrates 22, 38. A set of bonding pads are fabricated on each end of the gate and data-signal bus-lines for connection of LCD Driver IC (LDI) chips to the TFTs.

Figure 2:
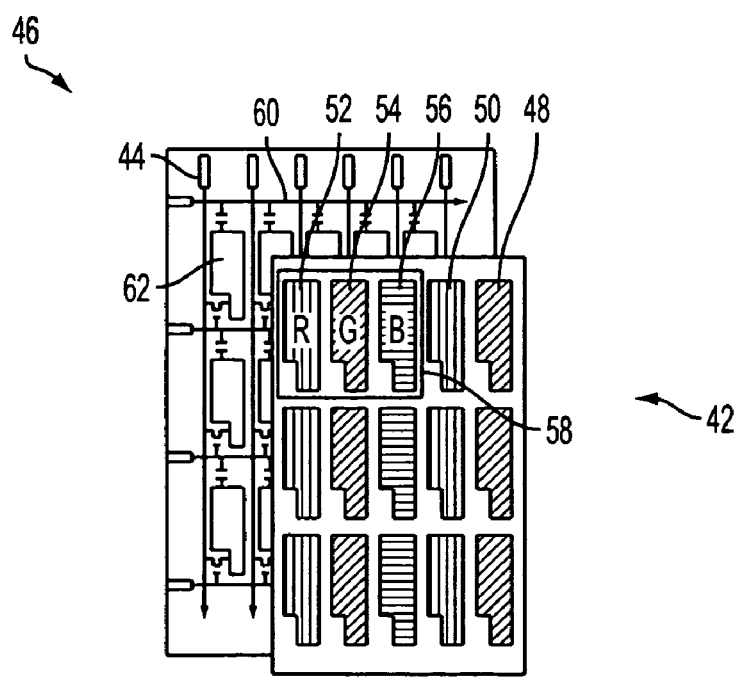
FIG. 2 is a layout diagram of an exemplary embodiment of a filter material array and associated TFT array for an LCD.

With reference to FIG. 2, a layout of an exemplary embodiment of a filter material array 42 and associated TFT array 44 for a display device (e.g., TFT LCD) 46 shows the relationship between the filter material cells and the TFTs. As shown, a color filter layer 48 includes a substrate (not shown), a black matrix 50 attached to the substrate and forming the filter material array 42, red filter material cells 52, green filter material cells 54, and blue filter material cells 56. The filter material may include a resin film in a primary color (e.g., red, green, or blue) dye or pigment. A filter material group 58 of three red, green, and blue filter material cells is an example of filter material groups for the color filter layer 48. The filter material group 58 corresponds to a color pixel of the associated display device (e.g., TFT LCD) and a group of three TFTs 60 in the TFT array 44. Each red, green, and blue filter material cell 52, 54, 56 corresponds to a primary color sub-pixel of the associated display device (e.g., TFT LCD) and a TFT 62 in the TFT array 44.

It is understood that the drawing depicts only a portion of both arrays. For example, in display device displaying 800 by 600 pixels (i.e., 480,000 pixels) the TFT array includes 1,440,000 TFTs and the filter material array includes 1,440,000 corresponding filter material cells both corresponding to 1,440,000 sub-pixels. Moreover, substrate sheets may be used to fabricate raw color filter material that can be used for multiple color filters. For example, a fifth generation substrate sheet is 1.250 m by 1.100 m, a sixth generation substrate sheet is 1.850 m by 1.500 m, and a seventh generation substrate sheet is 2.200 m by 1.870 m. Where sub-pixels are defined by 215 µm by 646 µm rectangular cells and the black matrix is 1.55 µm wide, the seventh generation substrate sheet may be used to print color filters for twelve 32" displays, eight 40" displays, multiple color filters for other sizes of displays, or color filters for various combinations of display sizes.

Figure 3:
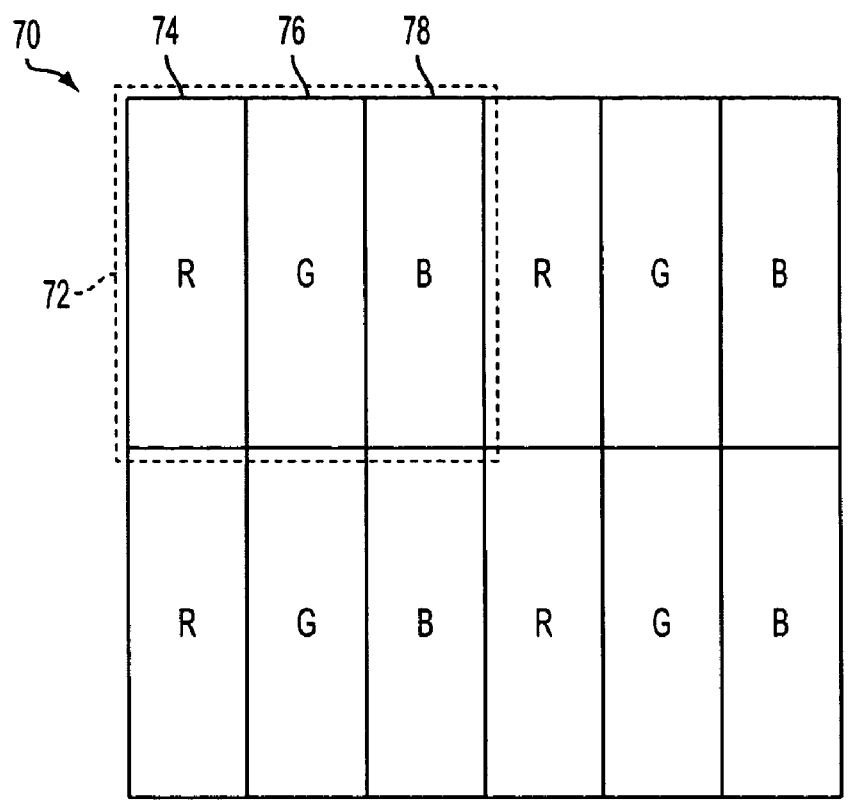
FIG. 3 is a diagram of an exemplary layout of pixels and sub-pixels for a striped configuration of a color filter for a display device.

With reference to FIG. 3, an exemplary layout of pixels and sub-pixels for a striped configuration 70 of a color filter for a display device is shown. A filter material group 72 of red, green, and blue filter material cells 74, 76, 78 corresponds to a group of three sub-pixels and forms a pixel. In this configuration, each filter material group 72 is generally square and arranged in rows and columns. This creates a red, green, and blue striped pattern in the color filter.

Figure 4:
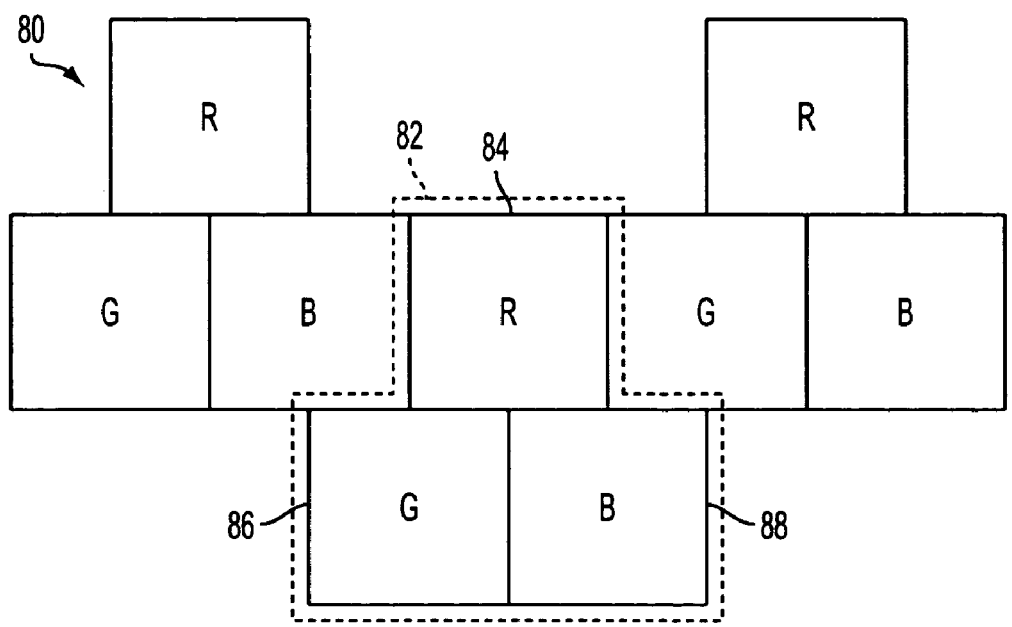
FIG. 4 is a diagram of an exemplary layout of pixels and sub-pixels for a delta configuration of a color filter for a display device.

With reference to FIG. 4, an exemplary layout of pixels and sub-pixels for a delta configuration 80 of a color filter for a display device is shown. Here again, a filter material group 82 of red, green, and blue filter material cells 84, 86, 88 corresponds to a group of three sub-pixels and forms a pixel. However, in this configuration, each filter material cell is generally square and each filter material group 82 is generally arranged with one filter material cell centered above the other two filter material cells. These filter material groups are arranged in integrated rows and columns. This creates a red, green, and blue delta pattern for each pixel throughout the color filter.

Figure 5:
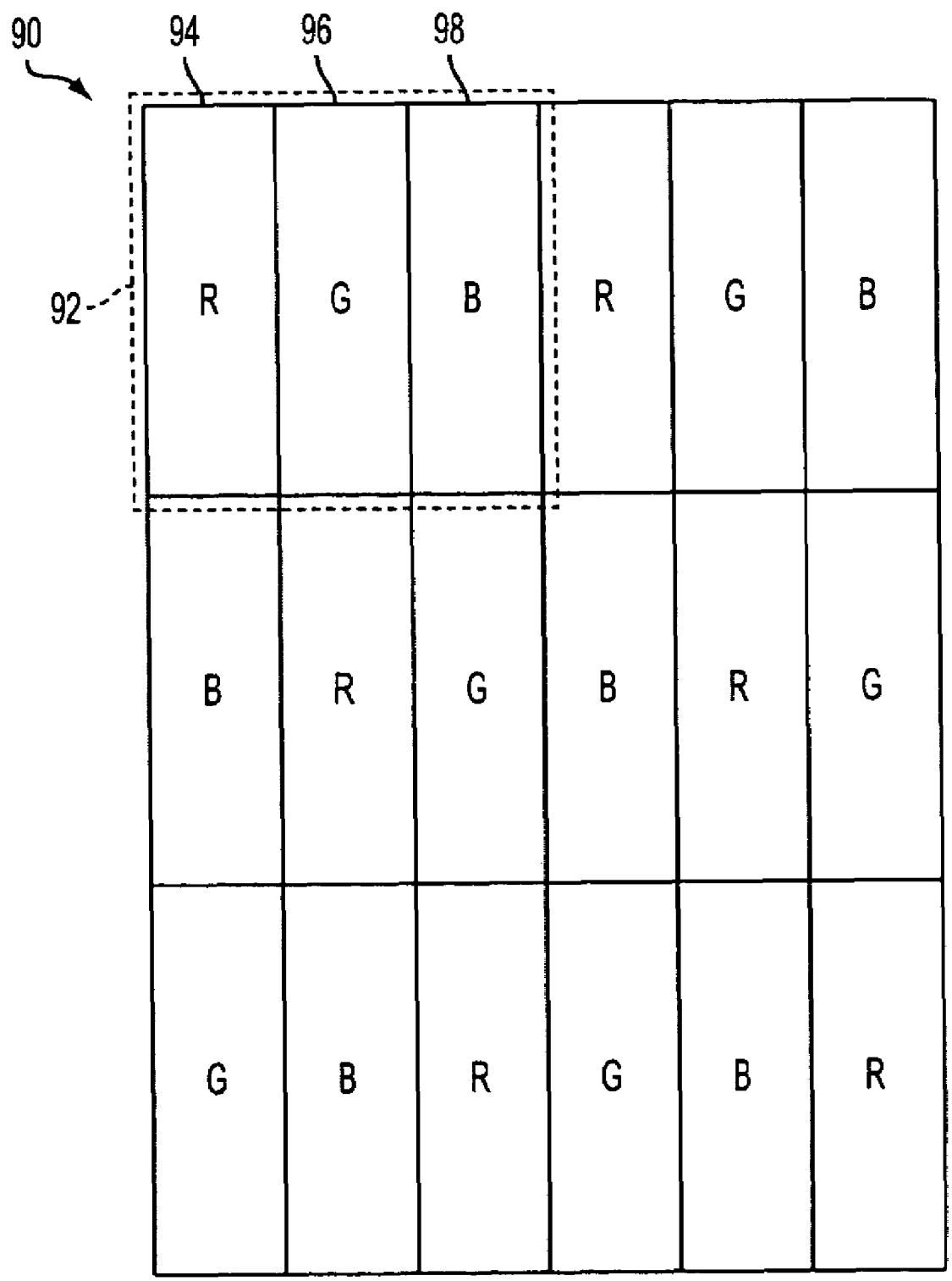
FIG. 5 is a diagram of an exemplary layout of pixels and sub-pixels for a mosaic configuration of a color filter for a display device.

With reference to FIG. 5, an exemplary layout of pixels and sub-pixels for a mosaic configuration 90 of a color filter for a display device is shown. Again, a filter material group 92 of red, green, and blue filter material cells 94, 96, 98 corresponds to a group of three sub-pixels and forms a pixel. However, in this configuration, each filter material group 92 is generally square and arranged in rows with staggered columns. This creates a red, green, and blue angled stripe pattern in the color filter that resembles a mosaic.

Alternate layouts of filter material groups (i.e., pixels) and filter material cells (i.e., sub-pixels) are also possible. Moreover, color filters may incorporate other primary colors, such as cyan, magenta, and yellow, groups of more or less than three filter material cells (i.e., sub-pixels), and other colors for filter material. For example, a color filter with a single color filter material, such as orange, may be fabricated for a display device, such as an LED. In such a color filter, the black matrix may be referred to as a framework because it may form a single recessed cell, a single row of recessed cells, or a single column of recessed cells, as well as arrays.

Inkjet print heads (i.e., functional liquid droplet ejecting heads) of an inkjet printer are capable of accurately ejecting very small ink droplets (i.e., liquid droplets) for forming into dots, and hence it is expected that they can be applied to various fields of component-manufacturing by using special inks, such as filter material, light emitting material, or photosensitive resins, etc., as functional liquid droplets (i.e., to-be-ejected liquids). Such an ejection system may be utilized for printing filter material in cells as part of fabrication of color filters for display devices, such as LCDs, LEDs, and PDP devices. In the following, the description will be given of an ejection system which is applied, according to an exemplary embodiment, to construction of a color filter and manufacturing methods (manufacturing processes) for printing filter material on a substrate and fabrication of a color filter.

Figure 6:
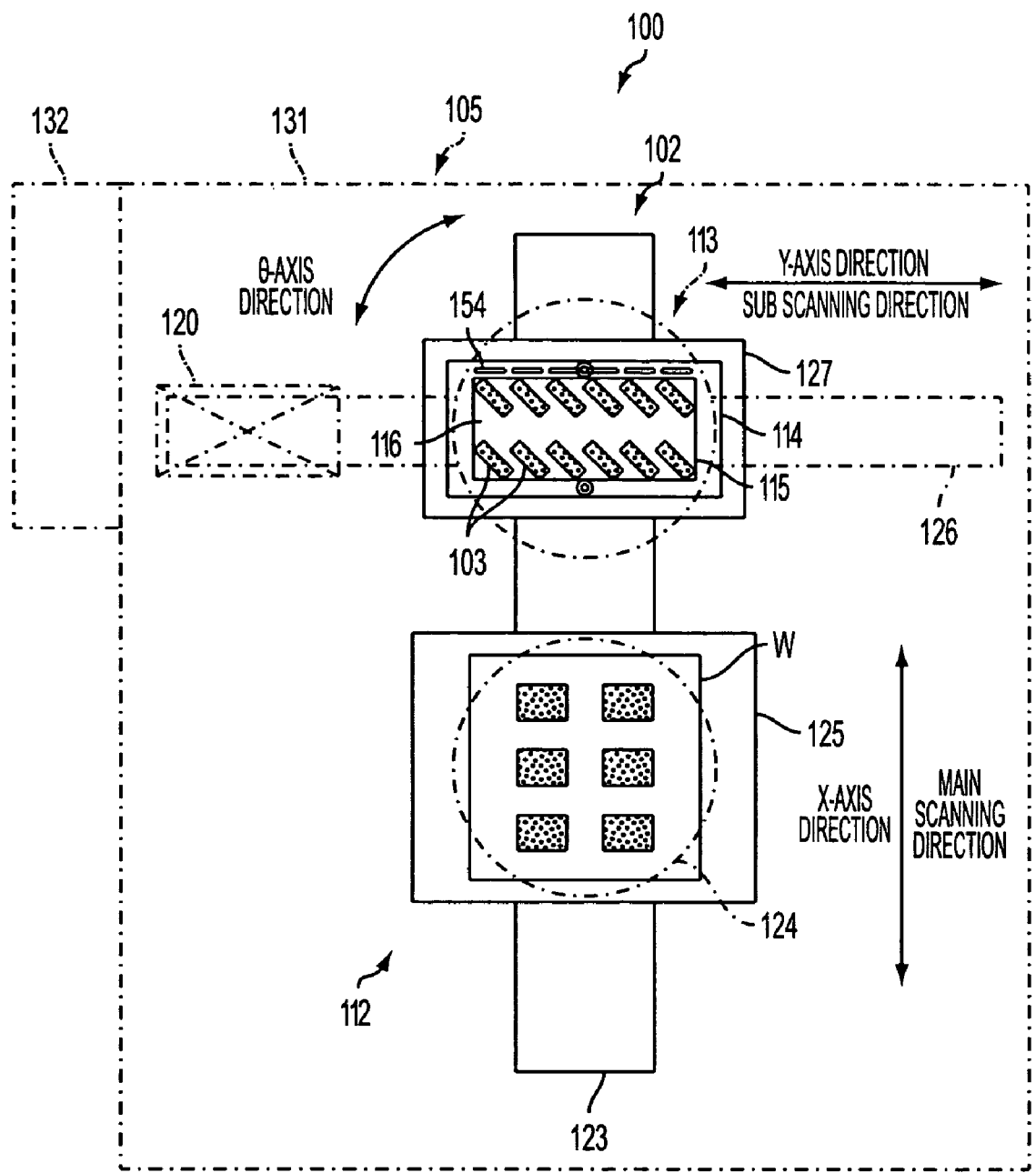
FIG. 6 is a plan view of an exemplary embodiment of a filter material ejection system with an inkjet print head that uses a drop size switching (DSS) printing process to print filter material on a substrate in conjunction with fabrication of a color filter.
Figure 7:
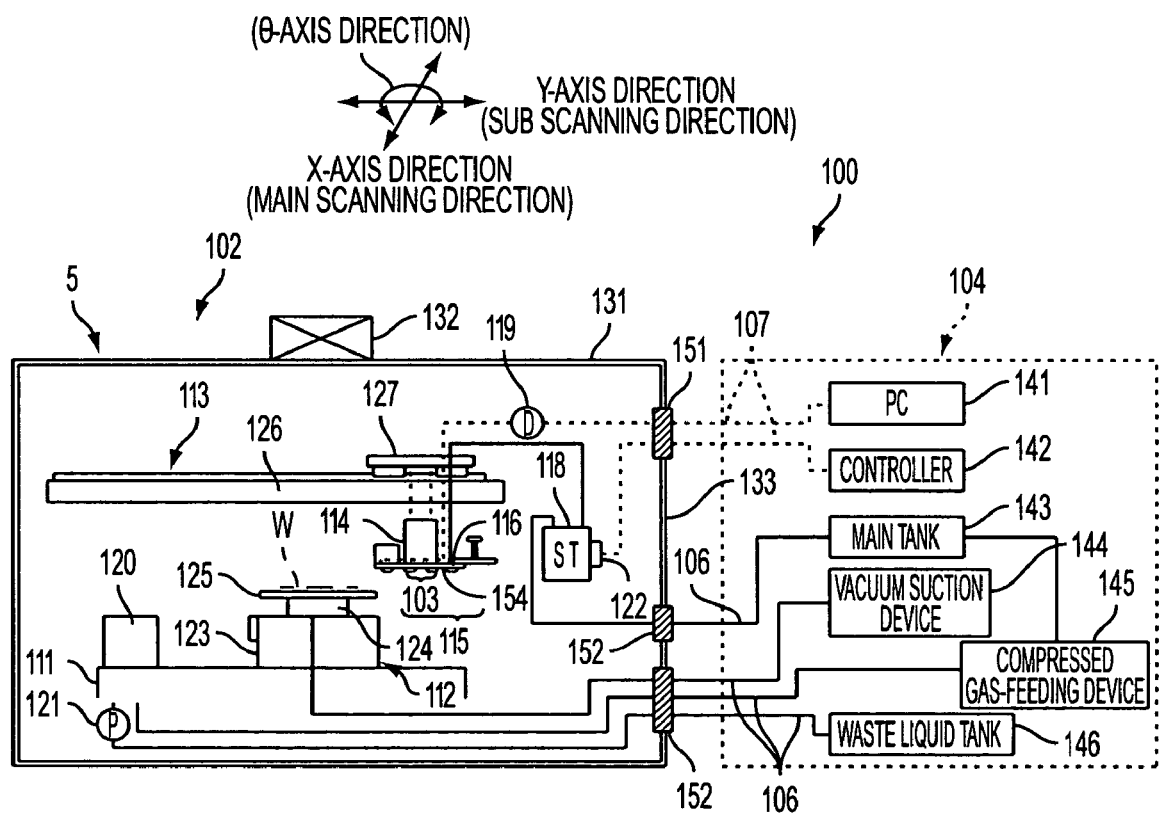
FIG. 7 is a functional diagram of the exemplary embodiment of the filter material ejection system of FIG. 6.

With reference to FIGS. 6 and 7, an exemplary embodiment of an ejection system 100 includes a liquid droplet ejecting apparatus (work processing apparatus) 102 having the functional liquid droplet ejecting heads 103 mounted thereon, and accessories 104 (see FIG. 7) for supplying functional liquid droplets (e.g., liquid filter material) to the liquid droplet ejecting apparatus 102. This ejection system 100 is similar to an ejection system and associated manufacturing processes disclosed in U.S. Pat. App. Publication No. 2003/0176005, filed by Takano et al., which is incorporated herein by reference. The liquid droplet ejecting apparatus 102 may be contained in a chamber unit 105. The chamber unit 105 and the accessories 104 arranged outside the chamber unit 105 may be connected to each other by connecting tubes (piping) 106 and connecting cables (wiring) 107. More specifically, the liquid droplet ejecting apparatus 102 may eject a filter material (i.e., functional liquid) onto a substrate W, which is a work, through the functional liquid droplet ejecting heads 103 carried thereon, thereby forming the filter material cells in the color filter layer and the like of a display device. A sequence of the manufacturing operations by the liquid droplet ejecting apparatus 102, including an ejection operation by the functional liquid droplet ejecting heads 103, may be carried out in the atmosphere of inert gas (nitrogen gas) formed within the chamber unit 105.

The liquid droplet ejecting apparatus 102 may be comprised of a base 111 formed by a stone surface plate and the like, an X-axis table 112 arranged on the base 111, a Y-axis table 113 orthogonal to the X-axis table 112, a main carriage 114 arranged under the Y-axis table 113 in a manner suspended there from, and a head unit 115 mounted on the main carriage 114. The head unit 115 may include a plurality of functional liquid droplet ejecting heads 103 mounted thereon via a sub-carriage 116.

Further, the liquid droplet ejecting apparatus 102 may incorporate a sub-tank 118 for supplying functional liquid (i.e., liquid filter material) to the functional liquid droplet ejecting heads 103 as well as a head driver 119 for driving the functional liquid droplet ejecting heads 103 to cause the same to eject the functional liquid. Further, the liquid droplet ejecting apparatus 102 may incorporate a flushing unit, not shown, for receiving regular flushing (non-printing ejection of functional liquid from all the nozzles) of the functional liquid droplet ejecting heads 103, a wiping unit, not shown, for wiping the surfaces of the nozzles of the functional liquid droplet ejecting heads 103, and a cleaning unit 120 for sucking functional liquid from the functional liquid droplet ejecting heads 103 for storage.

The X-axis table 112 may include a linear motor-driven X-axis slider 123 forming a driving system operating in an X-axis direction, and a Ø-table 124 and a suction table 125 for attracting the substrate W by suction of air, both mounted on the X-axis slider 123. In other embodiments, the substrate W may be supported on any suitable type of table by any suitable means. Further, the Y-axis table 113 may include a ball screw and a servomotor-driven Y-axis slider 126 forming a driving system operating in a Y-axis direction, and a bridge plate 127 mounted on the Y-axis slider 126, for suspending the main carriage 114.

The liquid droplet ejecting apparatus 102 may be configured such that the substrate W is moved in synchronism with the driving of the functional liquid droplet ejecting heads 103 (for selective ejection of functional liquid droplets). A so-called main scanning of the functional liquid droplet ejecting heads 103 is performed, for example, in accordance with reciprocating motion of the X-axis table 112 in the X-axis direction. Further, in a manner corresponding to the main scanning, a so-called sub scanning may be carried out by the Y-axis table 113 in accordance with reciprocating motion of the functional liquid droplet ejecting heads 103 in the Y-axis direction.

The accessories 104 may include a personal computer (PC) 141, a controller 142 for performing integrated control of the liquid droplet ejecting apparatus 102, and a main tank 143 for feeding functional liquid (i.e., liquid filter material) to the above sub-tank 118, all of which may be mounted on a common base of a cabinet type, not shown, as well as a vacuum suction device 144 connected to the suction table 125 and other related components, a compressed gas-feeding device 145 connected to a gas cylinder of the cleaning unit 120, and the main tank 143, and a waste ink tank 146 connected to the cleaning unit etc., via a suction pump 121. It should be noted that in the embodiment being described, inert gas whose temperature and water are controlled may be used as the gas fed from the compressed gas-feeding device 145.

For instance, the personal computer 141 produces and sends out ejection pattern data of functional liquid (i.e., liquid filter material) to be ejected from the functional liquid droplet ejecting heads 103, to the head driver 119 of the liquid droplet ejecting apparatus 102, while the controller 142 controls the feeding of functional liquid from the main tank 143, via the compressed gas-feeding device 145, based on a result of detection by a level sensor 122 arranged in the sub-tank 118. This may include use of a DSS printing process to switch the drop size of the ejections by the functional liquid droplet ejecting heads 103 between two or more sizes. The connection between the personal computer 141 and the head driver 119, and that between the level sensor 122 and the controller 142 may be effected by the connecting cables 107 passed through a wiring-through unit 151 extending through a wall (mainly, an upper portion of a side wall) 133 of the chamber room 131.

The ejection system 100 may include one or more sensors (e.g., microdensitometers) 154 to measure the optical density of filter material on the substrate W after it has been ejected and at least partially cured. The sensors 154 may be mounted on the functional liquid droplet ejecting heads 103 or any other suitable location the permits a scanning operation to measure optical density of filter material on the substrate W. Scanning and printing operations may be used in various sequences to ensure proper uniformity of the filter material in each filter material cell of the substrate W.

Figure 8:
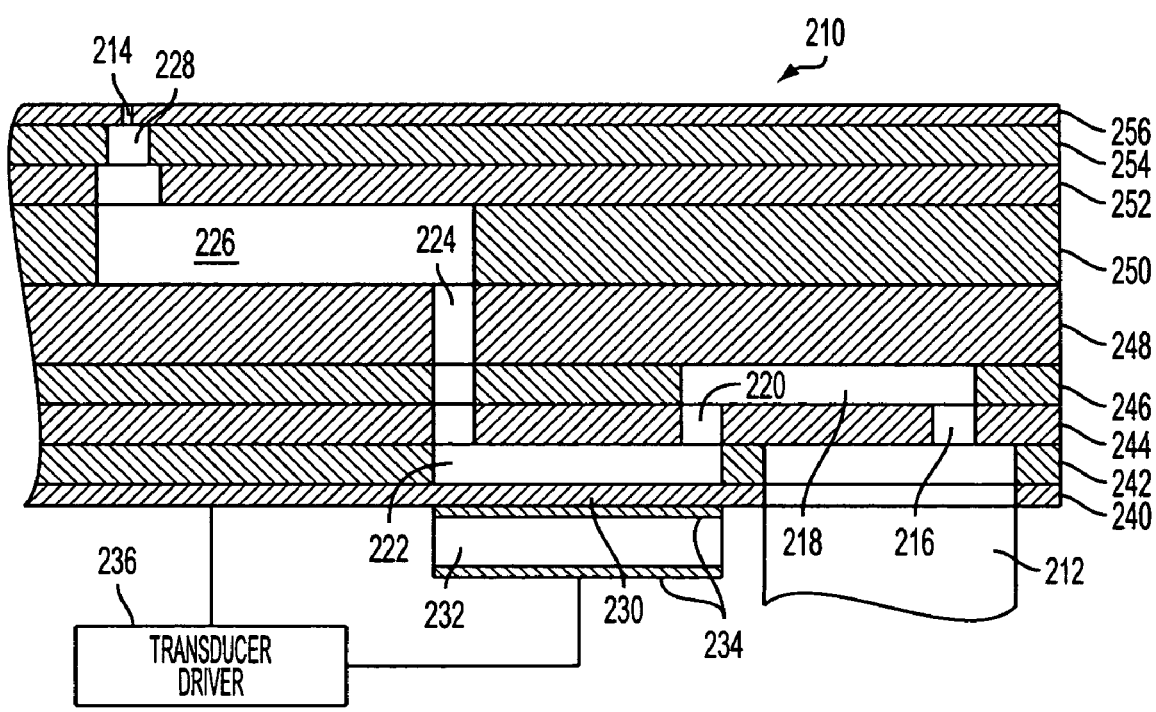
FIG. 8 is a functional diagram of an exemplary embodiment of an inkjet print head that uses a DSS printing process to print filter material on a substrate in conjunction with fabrication of a color filter.

With reference to FIG. 8, a cross-sectional view of an inkjet 210 which is part of a multiple-orifice inkjet print head suitable for use with the ejection system of FIGS. 6 and 7 is shown. This inkjet 210 is similar to an inkjet and associated DSS printing processes disclosed in U.S. Pat. No. 5,495,270 to Burr et al. and currently assigned to Xerox Corp., which is incorporated herein by reference. Various other configurations of inkjet print heads compatible with DSS printing processes may be used in the ejection system in place of the inkjet 210. For example, any type of piezo inkjet print head, acoustic inkjet print head, or thermal inkjet print head compatible with DSS printing processes may be implemented.

Inkjet 210 has a body that defines an ink manifold 212 through which ink (e.g., liquid filter material) is delivered to the inkjet print head. The body also defines an ink drop forming orifice 214 together with an ink flow path from ink manifold 212 to orifice 214. In general, the inkjet print head preferably includes an array of orifices 214 that are closely spaced from one another for use in printing drops of ink (e.g., liquid filter material) onto a print medium (e.g., color filter substrate, such as glass, polyethylene napthalate (PEN), or any suitable transparent material).

A typical inkjet print head for printing ink (e.g., liquid filter material) on a substrate for fabrication of a color filter may include three manifolds for receiving, red, green, and blue ink (e.g., liquid filter material) or another set of primary colors (e.g., cyan, magenta, and yellow). However, the number of such manifolds may be varied depending upon whether a printer is designed to print multiple colors simultaneously during the same pass of the print head or to individually print one or more colors. Ink (e.g., liquid filter material) flows from manifold 212, through an inlet port 216, an inlet channel 218, a pressure chamber port 220, and into an ink pressure chamber 222. Ink (e.g., liquid filter material) leaves pressure chamber 222 by way of an offset channel port 224, flows through an optional offset channel 226 and an outlet channel 228 to nozzle 214, from which ink drops are ejected. Omission of offset channel 226 may improve jetting performance.

Ink pressure chamber 222 is bounded on one side by a flexible diaphragm 234. An electromechanical transducer 232, such as a piezo transducer (PZT), is secured to diaphragm 230 by an appropriate adhesive and overlays ink pressure chamber 222. In a conventional manner, transducer 232 has metal film layers 234 to which an electronic transducer driver is electrically connected. Although other forms of transducers may be used, transducer 232 is operated in its bending mode such that when a voltage is applied across metal film layers 234, transducer 232 attempts to change its dimensions. However, because it is securely and rigidly attached to the diaphragm, transducer 232 bends, deforming diaphragm 30, and thereby displacing ink (e.g., liquid filter material) in ink pressure chamber 222, causing the outward flow of ink through passage 226 to nozzle 214. Refill of ink pressure chamber 222 following the ejection of an ink drop is augmented by reverse bending of transducer 234 and the concomitant movement of diaphragm 230.

The electromechanical transducer mechanism selected for the inkjet print heads of the present invention can comprise ceramic disc transducers bonded with epoxy to the diaphragm plate 240, with each of the discs centered over a respective ink pressure chamber 222. For this type of transducer mechanism, a substantially circular shape has the highest electromechanical efficiency, which refers to the volume displacement for a given area of the piezoceramic element.

Ejecting ink drops having controllable volumes from an inkjet head such as that of FIG.-8 entails providing from transducer driver 236, multiple selectable drive waveforms to transducer 232. Transducer 232 responds to the selected waveform by inducing pressure waves in the ink that excite ink fluid flow resonances in orifice 214 and at the ink surface meniscus. A different resonance mode is excited by each selected waveform and a different drop volume is ejected in response to each resonance mode.

Figure 9:
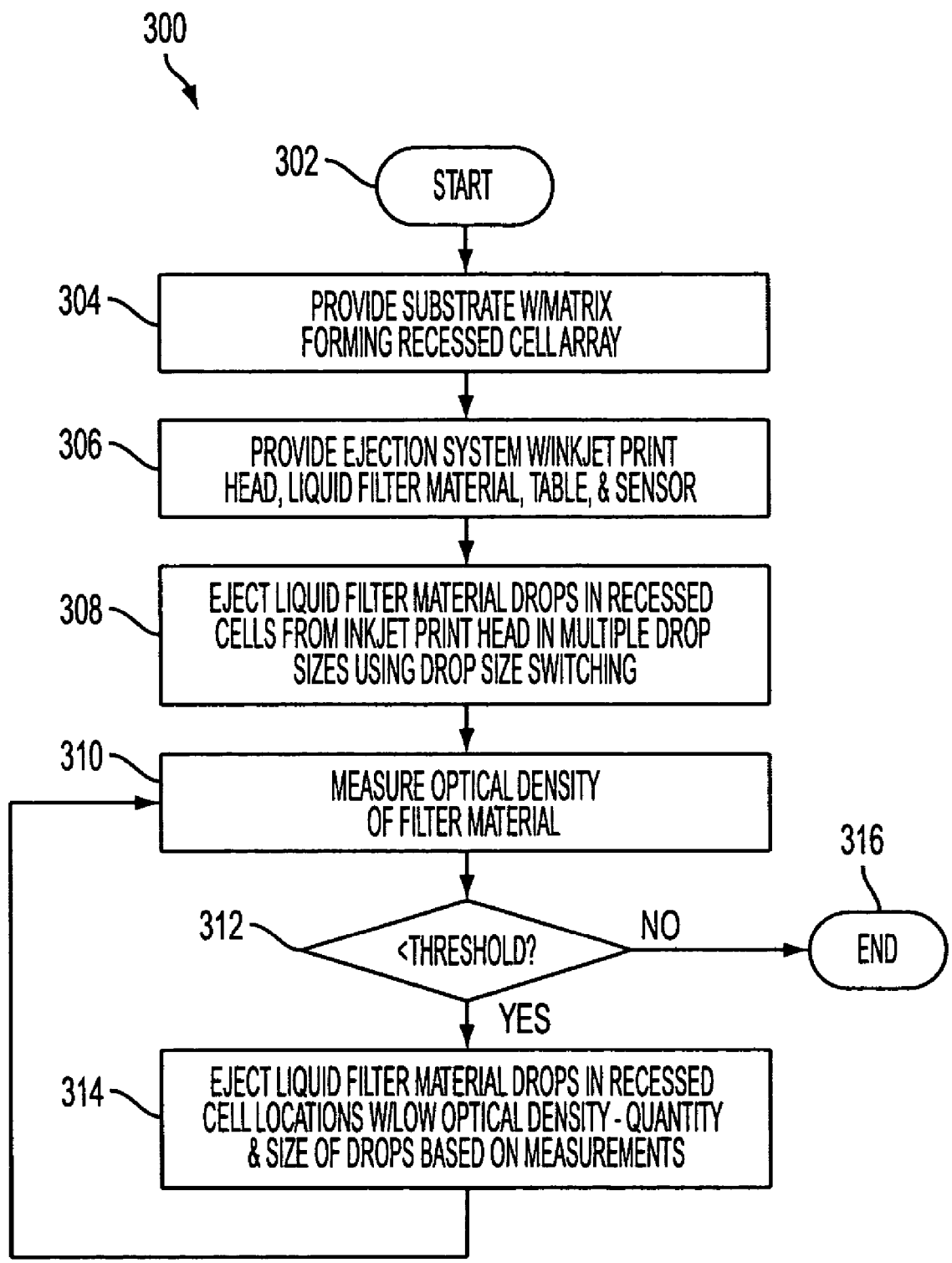
FIG. 9 is a flow chart of an exemplary embodiment of a process for printing filter material on a substrate using a DSS printing process in conjunction with fabrication of a color filter.

With reference to FIG. 9, an exemplary embodiment of a process 300 for printing filter material on a substrate using a DSS printing process in conjunction with fabrication of a color filter begins at 302. Next, the substrate with a matrix attached thereto is provided (304). The matrix forms an array of recessed cells, each recessed cell defined by a perimeter wall associated with the matrix and a bottom wall associated with the substrate. In an alternate embodiment, the matrix may be replaced with a framework that forms at least one recessed cell. At 306, a liquid filter material ejection system is provided. The ejection system includes an inkjet print head, one or more colors of liquid filter material to be selectively ejected by the inkjet print head, and a table supporting the substrate.

Next, a plurality of liquid filter material drops are selectively ejected from the inkjet print head using a DSS printing process into one or more recessed cells associated with the substrate and matrix (or framework) (308). The plurality of drops include at least one smaller drop and at least one larger drop selectively ejected in one or more passes of the inkjet print head across the corresponding recessed cell. Other size drops may also be ejected. One or more smaller drops may be ejected in a given recessed cell in one or more passes and one or more larger drops may be ejected in the same recessed cell in the same or subsequent passes. For example, in a subsequent pass, the larger drop(s) may be deposited in the center of the recessed cell when smaller drops previously deposited in the corners or along the perimeter are still wet. This allows for wetting into the corner recesses without spillage onto the matrix. Alternatively, the larger drop(s) may be deposited after the smaller drops are at least partially dried. In this example, the previous smaller drops provide a barrier to wetting by the subsequent larger drop(s). Once ejected, the liquid filter material begins to cure through either natural drying processes or heated processes to control the curing to form cured filter material. Where two or more colors of liquid filter material are to be ejected, various combination of colors, drop sizes, substrate locations, and recessed cell locations may be ejected during the same or subsequent passes of the inkjet print head across the substrate and corresponding recessed cells.

With the liquid filter at least partially cured, a sensor associated with the liquid filter material ejection system may be used to measure an optical density of the cured filter material (310). The sensor is disposed on the liquid filter material ejection system in a manner to permit scanning of the cured filter material on the substrate in a manner similar to the scanning associated with ejecting or printing the liquid filter material. The sensor, for example, may be a microdensitometer. If the optical density of any portion of cured filter material in the recessed cells is less than a predetermined threshold, the process advances to 314 and one or more additional drops of the liquid filter material are ejected from the inkjet print head using the DSS printing process in the corresponding recessed cell locations. The target location in the corresponding recessed cell, drop size, and quantity of drops is based at least in part on the previous optical density measurements. After 314 is completed, the process may return to 310 to measure the optical density again. In some cases, the process may end after 314 is completed, particularly with the use of DSS printing processes to precisely meter out drops to fill in non-uniform areas. When none of the optical density measurements are below the predetermined threshold, the process ends at 316. Note that if the optional sensor and/or optical density measurements are not implemented, the process ends after 308.

The sequence for ejecting drops performing optical density measurements may be repeated multiple times until a desired level of uniformity in optical density is achieved. Similarly, steps 308 and 310-314 may be repeated in various strategies until all recessed cells are uniformly printed. For example, steps 308 and 310-314 may be performed for all recessed cells to be printed with red filter material, then green, and then blue. Alternatively, steps 308 and 310-314 may be performed for a region of recessed cells, then, a next region, and additional regions until all recessed cells are printed.

Figure 10:
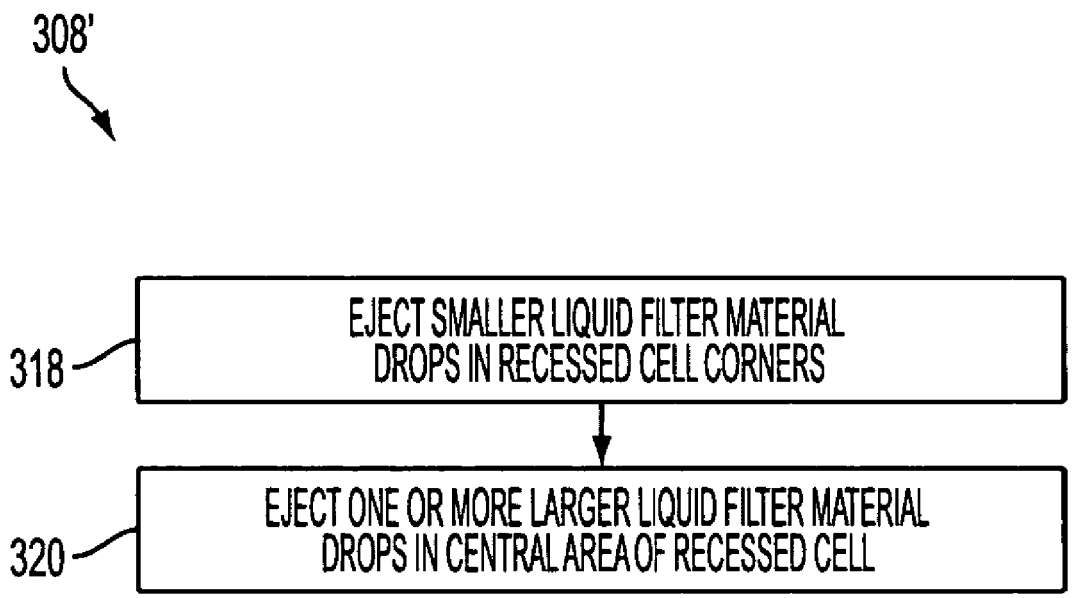
FIG. 10 is a flow chart of an exemplary embodiment of a process for printing filter material in a recessed cell of a substrate using a DSS printing process in conjunction with fabrication of a color filter.

With reference to FIG. 10, an exemplary embodiment of a process 308' to implement 308 of FIG. 9 is provided for geometric shaped recessed cells with three or more corners (e.g., rectangular shaped, etc.). At 318, at least one smaller liquid filter material drop is ejected in each corner of the geometric shaped recessed cell(s). Next, one or more larger liquid filter material drops are ejected in a central area of the corresponding geometric shaped recessed cell(s) (320). Note that 318 may be performed for multiple recessed cells before performing 320 for any of the multiple recessed cells. Alternatively, 318 and 320 may be performed for a given recessed cell before performing 318 for another recessed cell. Various sequences and combinations are envisioned. For example, 320 may be performed in a subsequent pass after the smaller drops are at least partially cured.

Figure 11:
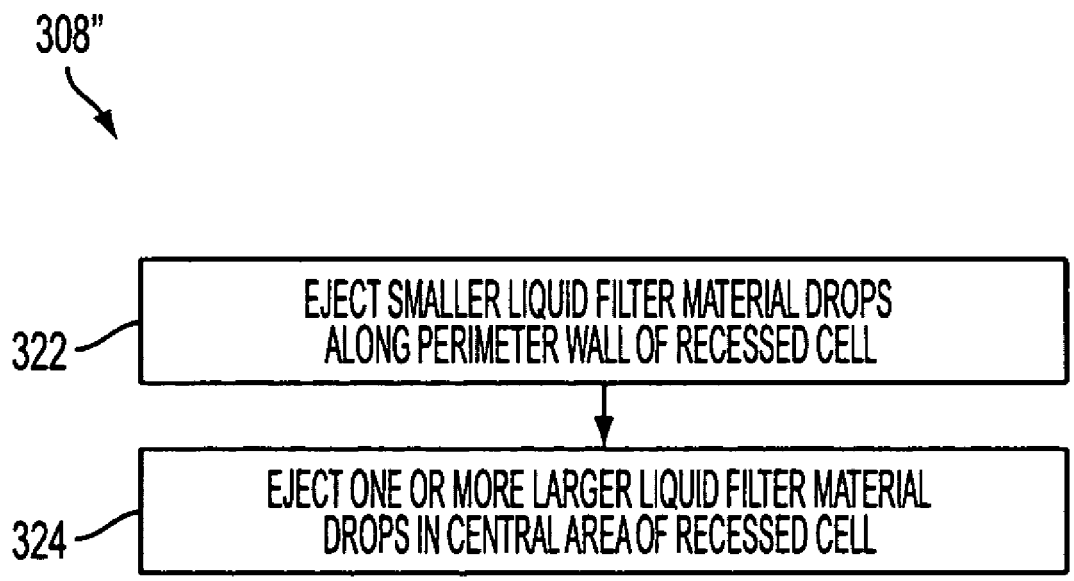
FIG. 11 is a flow chart of another exemplary embodiment of a process for printing filter material in a recessed cell of a substrate using a DSS printing process in conjunction with fabrication of a color filter.
Figure 12A:
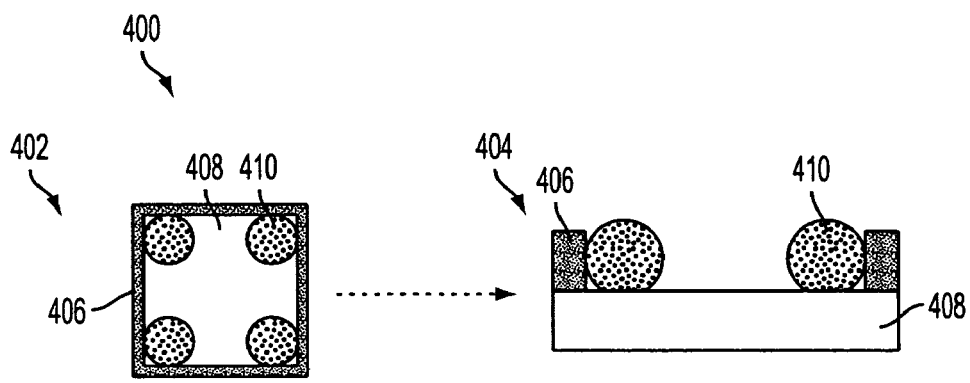
FIGS. 12A-12D are diagrams showing an exemplary sequence of conditions of a typical recessed cell for the embodiment of the process of FIG. 10.
Figure 12B:
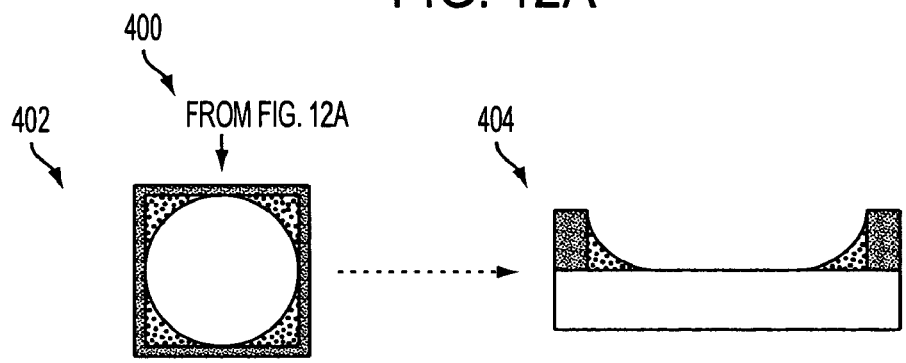
Figure 12C:
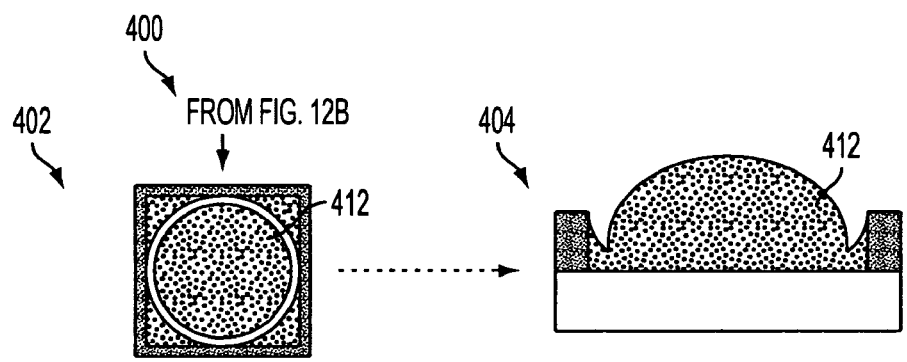
Figure 12D:
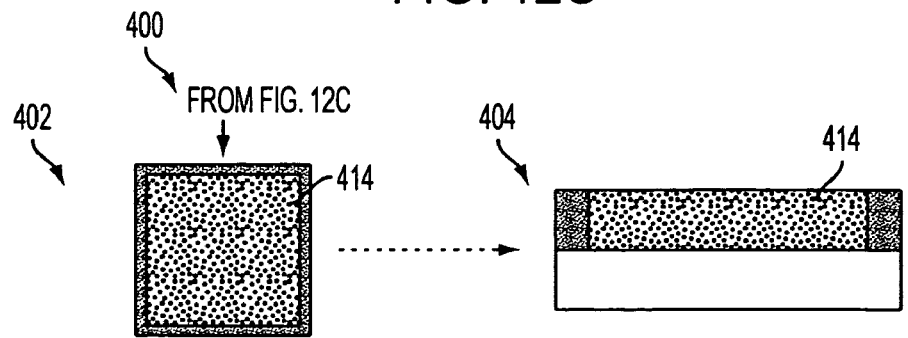
Figure 13A:
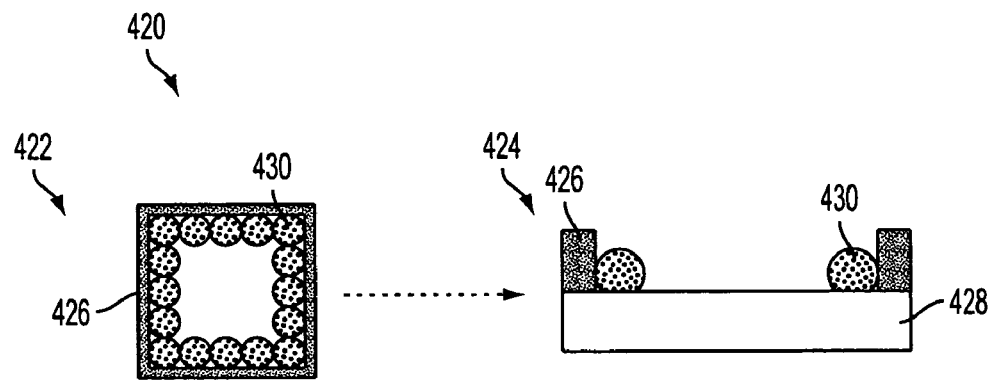
FIGS. 13A-13D are diagrams showing an exemplary sequence of conditions of a typical recessed cell for the embodiment of the process of FIG. 11.
Figure 13B:
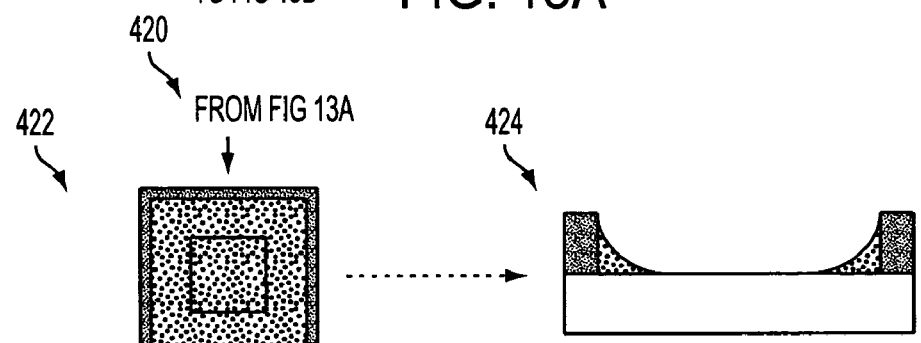
Figure 13C:
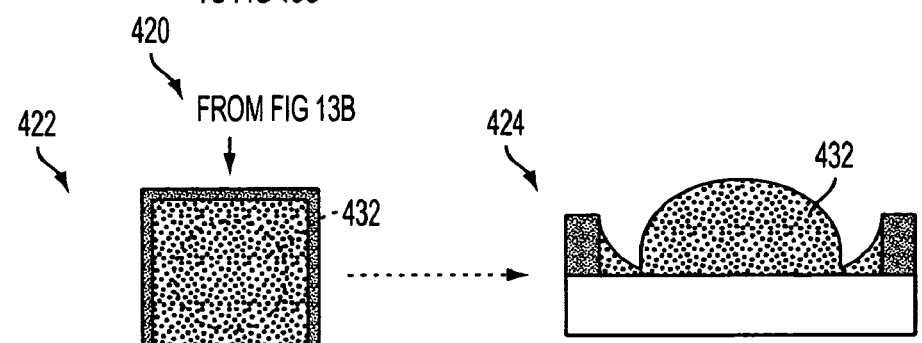
Figure 13D:
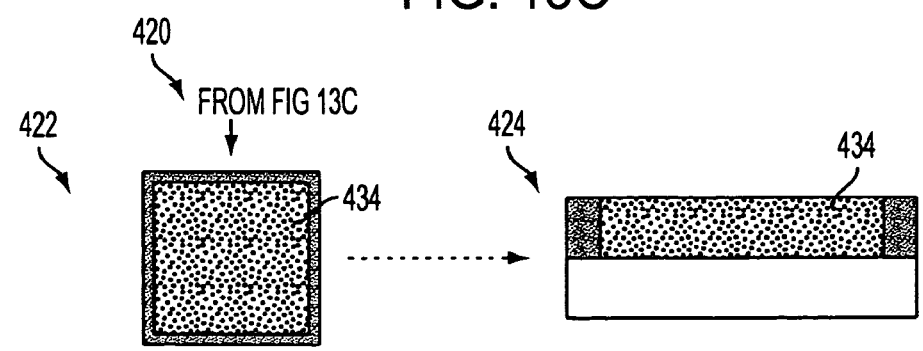

With reference to FIG. 11, another exemplary embodiment of a process 308'' to implement 308 of FIG. 9 begins at 322, where a plurality of smaller liquid filter material drops are ejected along the perimeter wall of one or more selected recessed cell. Next, one or more larger liquid filter material drops are ejected in a central area of the corresponding recessed cell(s) (324). Note that 322 may be performed for multiple recessed cells before performing 324 for any of the multiple recessed cells. Alternatively, 322 and 324 may be performed for a given recessed cell before performing 322 for another recessed cell. Various sequences and combinations are envisioned. For example, 324 may be performed in a subsequent pass after the smaller drops are at least partially cured.

With reference to FIGS. 12A-12D, the diagrams 400 depict a top view 402 and a cross sectional side view 404 of an exemplary sequence as shown in FIGS. 12A-D of conditions of a typical recessed cell for the embodiment of the process of FIG. 10. The recessed cell is defined by perimeter walls (i.e., black matrix (or framework)) 406 and a bottom wall (i.e., substrate) 408. At FIG. 12A, smaller liquid filter material drops 410 are ejected in the corners of the recessed cell. At FIG. 12B, the smaller liquid filter material drops begin to cure or dry and wick to the perimeter walls 406 and bottom wall 408 forming a dam with respect to the perimeter walls for subsequent liquid filter material drops. At FIG. 12C, a larger liquid filter material drop 412 is ejected in a central area of the recessed cell. At FIG. 12D, the liquid filter material drops have cured or dried to form cured filter material 414 for a corresponding sub-pixel of a color filter. As described above, more than one larger drop may be ejected in FIG. 12C. Moreover, where a sensor is used to detect the optical density of the cured filter material, between FIGS. 12C and 12D additional drops may be ejected in locations having an optical density measuring below a predetermined threshold. The size for these supplemental or touch up drops may vary depending on various factors, including the optical density measurements.

With reference to FIGS. 13A-13D, the diagram 420 depicts a top view 422 and a cross sectional side view 424 of an exemplary sequence as shown in FIGS. 13A-D of conditions of a typical recessed cell for the embodiment of the process of FIG. 11. The recessed cell is defined by perimeter walls (i.e., black matrix (or framework)) 426 and a bottom wall (i.e., substrate) 428. At FIG. 13A, smaller liquid filter material drops 430 are ejected along the perimeter walls 426 of the recessed cell. At FIG. 13B, the smaller liquid filter material drops begin to cure or dry and wick to the perimeter walls 426 and bottom wall 428 forming a dam with respect to the perimeter walls for subsequent liquid filter material drops. At FIG. 13C, a larger liquid filter material drop 432 is ejected in a central area of the recessed cell. At FIG. 13D, the liquid filter material drops have cured or dried to form cured filter material 434 for a corresponding sub-pixel of a color filter. As described above, more than one larger drop may be ejected in FIG. 13C. Moreover, where a sensor is used to detect the optical density of the cured filter material, between FIGS. 13C and 13D additional drops may be ejected in locations having an optical density measuring below a predetermined threshold. The size for these supplemental or touch up drops may vary depending on various factors, including the optical density measurements.

Another exemplary embodiment of a process to implement 308 of FIG. 9 is to simply eject smaller drops throughout the recessed cell in one or more passes. Then, using the sensor to detect the optical density of the recessed cell and where appropriate, eject supplemental or touch up drops that may vary depending on various factors, including the optical density measurements. The optical density measurements and supplemental drops may be repeated iteratively until the optical density of the at least partially cured filter material is suitably uniform.

The disclosure provided herein references exemplary embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method of printing a filter material on a substrate in conjunction with fabrication of a color filter, including:
   a) providing a substrate with a framework attached thereto, the framework forming at least one cell, each cell defined by a perimeter wall associated with the framework and a bottom wall associated with the substrate;
   b) providing a liquid filter material ejection system with an inkjet print head, a first liquid filter material to be selectively ejected by the inkjet print head, and a table supporting the substrate; and
   c) selectively ejecting a plurality of drops of the first liquid filter material in one or more of the at least one cells from the inkjet print head using a drop size switching printing process, wherein the plurality of drops of the first liquid filter material associated with each corresponding cell include at least one smaller drop and at least one larger drop selectively ejected in one or more passes of the inkjet print head across the corresponding cell.

2. The method set forth in claim 1 wherein the perimeter wall of one or more of the at least one cell forms a geometric shape with three or more corners and the first liquid filter material is ejected in at least one of the geometric shaped cells, the ejecting in c) further including:
   d) selectively ejecting at least one smaller drop in each corner of the corresponding geometric shaped cell; and
   e) selectively ejecting at least one larger drop in a central area of the corresponding geometric shaped cell.

3. The method set forth in claim 2 wherein the smaller drops are selectively ejected in one or more passes of the inkjet print head across the corresponding geometric shaped cell and the at least one larger drop is selectively ejected in a subsequent pass of the inkjet print head across the corresponding geometric shaped cell.

4. The method set forth in claim 3 wherein the subsequent pass is after the first liquid filter material associated with the smaller drops is at least partially cured.

5. The method set forth in claim 1, the ejecting in c) further including:
   d) selectively ejecting a plurality of smaller drops along the perimeter wall of each of the one or more corresponding cells; and
   e) selectively ejecting at least one larger drop in a central area of each of the one or more corresponding cells.

6. The method set forth in claim 5 wherein the smaller drops along the perimeter wall are selectively ejected in one or more passes of the inkjet print head across the corresponding cell and the at least one larger drop is selectively ejected in a subsequent pass of the inkjet print head across the corresponding cell.

7. The method set forth in claim 6 wherein the subsequent pass is after the first liquid filter material associated with the smaller drops along the perimeter wall is at least partially cured.

8. The method set forth in claim 1 wherein the first liquid filter material at least partially cures after ejection to form a first cured filter material in each corresponding cell, wherein the liquid filter material ejection system includes a sensor disposed to measure an optical density of the first cured filter material at a plurality of locations in each corresponding cell, the method further including:
   d) selectively measuring an optical density of the first cured filter material at each of a plurality of locations in each corresponding cell; and
   e) if the optical density of any portion of the first cured filter material in any corresponding cell location is less than a predetermined threshold, selectively ejecting one or more drops of the first liquid filter material in each of the corresponding cells from the inkjet print head using a drop size switching printing process, wherein a target location in the corresponding cell for each drop, a size of each drop, and a quantity of the one or more drops is based at least in part on the optical density measurements for the corresponding cell.

9. The method set forth in claim 8 wherein the sensor is a microdensitometer.

10. A method of fabricating a color filter, including:
   a) providing a substrate with a matrix attached thereto, the matrix forming an array of recessed cells, each recessed cell defined by a perimeter wall associated with the matrix and a bottom wall associated with the substrate;
   b) providing a liquid filter material ejection system with an inkjet print head, a first liquid filter material to be selectively ejected by the inkjet print head, a second liquid filter material to be selectively ejected by the inkjet print head, a third liquid filter material to be selectively ejected by the inkjet print head, and a table supporting the substrate;
   c) fixing a first cured filter material to a first portion of the recessed cells by selectively ejecting a plurality of drops of the first liquid filter material in each of the first portion recessed cells from the inkjet print head using a drop size switching printing process, the first liquid filter material at least partially curing after ejection to form the first cured filter material, wherein the plurality of drops of the first liquid filter material associated with the corresponding first portion recessed cell include at least one smaller drop and at least one larger drop selectively ejected in one or more passes of the inkjet print head across the corresponding first portion recessed cell;

d) fixing a second cured filter material to a second portion of the recessed cells by selectively ejecting a plurality of drops of the second liquid filter material in each of the second portion recessed cells from the inkjet print head using a drop size switching printing process, the second liquid filter material at least partially curing after ejection to form the second cured filter material, wherein the plurality of drops of the second liquid filter material associated with the corresponding second portion recessed cell include at least one smaller drop and at least one larger drop selectively ejected in one or more passes of the inkjet print head across the corresponding second portion recessed cell; and e) fixing a third cured filter material to a third portion of the recessed cells by selectively ejecting a plurality of drops of the third liquid filter material in each of the third portion recessed cells from the inkjet print head using a drop size switching printing process, the third liquid filter material at least partially curing after ejection to form the third cured filter material, wherein the plurality of drops of the third liquid filter material associated with the corresponding third portion recessed cell include at least one smaller drop and at least one larger drop selectively ejected in one or more passes of the inkjet print head across the corresponding third portion recessed cell.

11. The method set forth in claim 10 wherein the recessed cells are arranged in groups of three recessed cells, each recessed cell group including a first portion recessed cell, a second portion recessed cell, and a third portion recessed cell and corresponding to a pixel associated with the display device.

12. The method set forth in claim 11 wherein the first cured filter material is red, the second cured filter material is green, and the third cured filter material is blue.

13. The method set forth in claim 11 wherein the recessed cell groups and constituent first portion recessed cells, second portion recessed cells, and third portion recessed cells are arranged in one of a stripe configuration, a mosaic configuration, and a delta configuration.

14. The method set forth in claim 10 wherein the liquid filter material ejection system includes a sensor disposed to measure an optical density of the first cured filter material at a plurality of locations in each first portion recessed cell, an optical density of the second cured filter material at a plurality of locations in each second portion recessed cell, and an optical density of the third cured filter material at a plurality of locations in each third portion recessed cell, the method further including:

f) selectively measuring an optical density of the first cured filter material at each of a plurality of locations in each first portion recessed cell;

g) if the optical density of any portion of the first cured filter material in any first portion recessed cell location is less than a predetermined threshold, selectively ejecting one or more drops of the first liquid filter material in each of the corresponding first portion recessed cells from the inkjet print head using a drop size switching printing process, wherein a target location in the corresponding first portion recessed cell for each drop, a size of each drop, and a quantity of the one or more drops is based at least in part on the optical density measurements for the corresponding first portion recessed cell; and h) performing f) and g) for the second cured filter material and each second portion recessed cell; and i) performing f) and g) for the third cured filter material and each third portion recessed cell.

15. A color filter for a display device, including:
a substrate;
a framework attached to the substrate and forming at least one cell, each cell defined by a perimeter wall associated with the framework and a bottom wall associated with the substrate;
a first cured filter material fixed to one or more of the at least one cell, wherein the first cured filter material is formed in each of the corresponding cells by selectively ejecting a plurality of drops of a first liquid filter material from an inkjet print head using a drop size switching printing process, wherein the plurality of drops of the first liquid filter material associated with each corresponding cell include at least one smaller drop and at least one larger drop selectively ejected in one or more passes of the inkjet print head across the corresponding cell.

16. The color filter set forth in claim 15 wherein the perimeter wall of one or more of the at least one cell forms a geometric shape with three or more corners and the first cured filter material is to be fixed to at least one of the geometric shaped cells, wherein the plurality of drops of the first liquid filter material associated with each corresponding geometric shaped cell include at least one smaller drop selectively ejected in each corner of the corresponding geometric shaped cell and at least one larger drop selectively ejected in a central area of the corresponding geometric shaped cell.

17. The color filter set forth in claim 15 wherein the plurality of drops of the first liquid filter material associated with one or more of the corresponding cells include a plurality of smaller drops selectively ejected along the perimeter wall of each of the one or more corresponding cells and at least one larger drop selectively ejected in a central area of each of the one or more corresponding cells.

18. The color filter set forth in claim 15, the framework including:
a matrix attached to the substrate and forming an array of cells, wherein the first cured filter material is fixed to a first portion of the cells; and
the color filter further including:
a second cured filter material fixed to a second portion of the cells, wherein the second cured filter material is formed in each of the second portion cells by selectively ejecting a plurality of drops of a second liquid filter material from the inkjet print head using the drop size switching printing process, wherein the plurality of drops of the second liquid filter material associated with the corresponding second portion cell include at least one smaller drop and at least one larger drop selectively ejected in one or more passes of the inkjet print head across the corresponding second portion cell; and
a third cured filter material fixed to a third portion of the cells, wherein the third cured filter material is formed in each of the third portion cells by selectively ejecting a plurality of drops of a third liquid filter material from the inkjet print head using the drop size switching printing process, wherein the plurality of drops of the third liquid filter material associated with the corresponding third portion cell include at least one smaller drop and at least one larger drop selectively ejected in one or more passes of the inkjet print head across the corresponding third portion cell.

19. The color filter set forth in claim 18 wherein the cells are arranged in groups of three cells, each cell group including a first portion cell, a second portion cell, and a third portion cell, and each cell group corresponding to a pixel associated with the display device.

20. The color filter set forth in claim 19 wherein the cell groups and constituent first portion cells, second portion cells, and third portion cells are arranged in one of a stripe configuration, a mosaic configuration, and a delta configuration.

21. The method set forth in claim 1 wherein at least one first orifice of the inkjet print head selectively ejects different sized drops of the first liquid filter material during the ejecting in c).

22. The method set forth in claim 10 wherein at least one first orifice of the inkjet print head selectively ejects different sized drops of the first liquid filter material during the ejecting in c), at least one second orifice of the inkjet print head selectively ejects different sized drops of the second liquid filter material during the ejecting in d), and at least one third orifice of the inkjet print head selectively ejects different sized drops of the third liquid filter material during the ejecting in e).

23. The color filter set forth in claim 15 wherein the ejecting of the first liquid filter material to form the first cured filter material includes selectively ejecting different sized drops of the first liquid filter material from at least one first orifice of the inkjet print head during the one or more passes of the inkjet print head.

24. The color filter set forth in claim 18 wherein the ejecting of the second liquid filter material to form the second cured filter material includes selectively ejecting different sized drops of the second liquid filter material from at least one second orifice of the inkjet print head during the one or more passes of the inkjet print head and the ejecting of the third liquid filter material to form the third cured filter material includes selectively ejecting different sized drops of the third liquid filter material from at least one third orifice of the inkjet print head during the one or more passes of the inkjet print head.

25. The color filter set forth in claim 15 wherein the forming of the first cured filter material further includes at least partially curing the first liquid filter material after ejection to form a first partially cured filter material in each corresponding cell, wherein the liquid filter material ejection system includes a sensor disposed to measure an optical density of the first partially cured filter material at a plurality of locations in each corresponding cell, the forming of the first cured filter material further including selectively measuring an optical density of the first partially cured filter material at each of a plurality of locations in each corresponding cell and, if the optical density of any portion of the first partially cured filter material in any corresponding cell location is less than a predetermined threshold, selectively ejecting one or more drops of the first liquid filter material in each of the corresponding cells from the inkjet print head using a drop size switching printing process, wherein a target location in the corresponding cell for each drop, a size of each drop, and a quantity of the one or more drops is based at least in part on the optical density measurements for the corresponding cell.

* * * * *